United States Patent
Yang

(10) Patent No.: US 9,658,674 B2
(45) Date of Patent: May 23, 2017

(54) MOBILE SYSTEM OPTIMIZATION METHOD

(71) Applicant: Samsung Electronics Co., Ltd., Suwon-si (KR)

(72) Inventor: Seung-Soo Yang, Hwaseong-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 356 days.

(21) Appl. No.: 14/198,744

(22) Filed: Mar. 6, 2014

(65) Prior Publication Data

US 2014/0258751 A1 Sep. 11, 2014

(30) Foreign Application Priority Data

Mar. 11, 2013 (KR) .................. 10-2013-0025875

(51) Int. Cl.
*G06F 1/32* (2006.01)

(52) U.S. Cl.
CPC .......... *G06F 1/3228* (2013.01); *G06F 1/3206* (2013.01); *G06F 1/3234* (2013.01)

(58) Field of Classification Search
CPC .... G06F 1/3228; G06F 1/3206; G06F 1/3234; G06F 11/302; G06F 11/3409; G06F 11/3414; G06F 11/3442; G06F 11/3466
See application file for complete search history.

(56) References Cited

U.S. PATENT DOCUMENTS

| | | |
|---|---|---|
| 6,138,103 A | 10/2000 | Cheng et al. |
| 7,233,921 B2 | 6/2007 | Takeda et al. |
| 7,512,543 B2 | 3/2009 | Raghuraman et al. |
| 7,680,719 B1 | 3/2010 | Brady et al. |
| 7,716,151 B2 * | 5/2010 | Tiwari ............. G06N 5/02 703/21 |
| 7,893,335 B2 | 2/2011 | Szczap |
| 7,983,975 B2 | 7/2011 | Jones et al. |
| 8,175,990 B1 | 5/2012 | Hodjat et al. |
| 8,180,465 B2 | 5/2012 | Sinclair et al. |
| 8,214,250 B2 | 7/2012 | Notani et al. |
| 8,224,348 B2 | 7/2012 | Bolon et al. |
| 8,255,716 B2 | 8/2012 | Mandyam |
| 8,311,652 B2 | 11/2012 | Taha et al. |
| 8,312,549 B2 | 11/2012 | Goldberg et al. |
| 8,316,428 B2 | 11/2012 | Kozat et al. |
| 8,320,898 B2 * | 11/2012 | Salsbery ......... G06F 1/3203 455/418 |
| 2005/0108687 A1 | 5/2005 | Mountain et al. |
| 2007/0128899 A1 | 6/2007 | Mayer |
| 2008/0085497 A1 | 4/2008 | Holmes |
| 2008/0177994 A1 | 7/2008 | Mayer |
| 2009/0115488 A1 | 5/2009 | Cortadella et al. |
| 2009/0115503 A1 | 5/2009 | Cortadella et al. |
| 2009/0116597 A1 | 5/2009 | Cortadella et al. |
| 2009/0119621 A1 | 5/2009 | Cortadella et al. |

(Continued)

*Primary Examiner* — Dennis M Butler
(74) *Attorney, Agent, or Firm* — Onello & Mello LLP

(57) ABSTRACT

Provided is a method of a mobile system, comprising executing an application at the mobile system, determining an execution condition of the application, and controlling a performance of the mobile system in response to a result of the determined execution condition before the application performs an actual workload. The mobile system optimization method enhances the performance of the mobile system by utilizing the same resources.

14 Claims, 12 Drawing Sheets

(56) References Cited

U.S. PATENT DOCUMENTS

| | | |
|---|---|---|
| 2009/0119622 A1 | 5/2009 | Cortadella et al. |
| 2009/0119631 A1 | 5/2009 | Cortadella et al. |
| 2009/0187425 A1 | 7/2009 | Thompson |
| 2010/0015579 A1 | 1/2010 | Schlabach |
| 2011/0208984 A1 | 8/2011 | Naware et al. |
| 2011/0310751 A1 | 12/2011 | Song et al. |
| 2012/0069131 A1 | 3/2012 | Abelow |
| 2012/0084028 A1* | 4/2012 | Kumar ............... G06F 1/3206 702/61 |
| 2012/0210325 A1* | 8/2012 | de Lind Van Wijngaarden ..... H04W 52/0258 718/103 |
| 2012/0233258 A1 | 9/2012 | Vijayaraghavan et al. |

* cited by examiner

MOBILE SYSTEM OPTIMIZATION METHOD

CROSS-REFERENCE TO RELATED APPLICATION

This application claims priority under 35 U.S.C. §119 to Korean Patent Application No. 10-2013-0025875 filed on Mar. 11, 2013, the disclosure of which is hereby incorporated by reference in its entirety.

BACKGROUND

Field

Embodiments of the inventive concept relate to a mobile system, and more particularly, to a mobile system optimization method for optimizing the execution of an application that is installed at the mobile system.

Description of Related Art

In a mobile system, a plurality of applications may be installed. If an application installed in the mobile system is executed, a workload of an application processor may increase in order to execute the application. As the workload of the application processor increases, an operation clock or drive voltage of the application processor may likewise increase.

Typically, the mobile system provides the same performance based on limited resources. The performance of the mobile system is rated by a bench-marking application, such as Quadrant™, Antutu™, etc.

SUMMARY

Embodiments of the inventive concept provide an optimization method of a mobile system capable of providing optimum performance for executing an application.

The technical objectives of the inventive concept are not limited to the above disclosure; other objectives may become apparent to those of ordinary skill in the art based on the following descriptions.

In accordance with an aspect of the inventive concept, a method for managing a performance of a mobile system comprises executing an application at the mobile system; determining an execution condition of the application; and controlling a performance of the mobile system in response to a result of the determined execution condition before the application performs an actual workload.

In some embodiments, the executing of the application may include preparing for a workload of the application, executing the actual workload by the application, and terminating the workload by the application.

In some embodiments, controlling the performance of the mobile system comprises increasing the performance of the mobile system contemporaneously with the application preparing for the actual workload.

In some embodiments, determining the execution condition of the application comprises parsing the application and controlling the performance of the mobile system in accordance with the parsed result.

In some embodiments, parsing the application comprises identifying whether one among an ID, an event, and a use case of the application is used.

In some embodiments, controlling the performance of the mobile system comprises regulating at least one of an operation clock of the mobile system, a drive voltage supplied to hardware forming the mobile system, and a bandwidth of a data bus.

In some embodiments, the method further comprises reducing the performance of the mobile system in response to a termination of the execution of the application.

In accordance with an aspect of the inventive concept, a method for managing a performance of a mobile system equipped with a built-in application, the method comprises executing the built-in application; receiving execution information about the built-in application; and controlling a performance of the mobile system with reference to the received execution information before the built-in application executes an actual workload.

In some embodiments, executing the built-in application comprises: preparing for a workload of the built-in application; executing the actual workload by the built-in application; and terminating the workload of the built-in application.

In some embodiments, controlling the performance of the mobile system comprises increasing the performance of the mobile system while the built-in application prepares for the workload.

In some embodiments, receiving the execution information about the built-in application comprises receiving information about which operation is executed by the built-in application.

In some embodiments, controlling the performance of the mobile system comprises: regulating at least one of an operation clock of the mobile system, a drive voltage supplied to hardware forming the mobile system, and a bandwidth of a data bus.

In some embodiments, the method further comprises reducing the performance of the mobile system in response to a termination of the execution of the built-in application.

In some embodiments, executing the actual workload of the built-in application comprises increasing a workload of the mobile system.

In some embodiments, increasing the workload of the mobile system comprises increasing the performance of the mobile system in accordance with the workload of the mobile system.

In accordance with an aspect of the inventive concept, a method for managing performance of a mobile system comprises executing an application by a processor at the mobile system; determining whether an execution condition of the application is satisfied; and controlling a performance of the mobile system in response to a determination that the execution condition of the application is satisfied.

In some embodiments, the performance is controlled before an actual workload of the application is executed.

In some embodiments, controlling the performance of the mobile system comprises increasing the performance of the mobile system contemporaneously with the application preparing for a workload.

In some embodiments, determining the execution condition of the application comprises: parsing the application and controlling the performance of the mobile system in accordance with the parsed result.

In some embodiments, the method further comprises reducing the performance of the mobile system in response to a termination of the execution of the application.

BRIEF DESCRIPTION OF THE DRAWINGS

The foregoing and other features and advantages of the inventive concepts will be apparent from the more particular description of preferred embodiments of the inventive concepts, as illustrated in the accompanying drawings in which like reference characters refer to the same parts throughout the different views. The drawings are not necessarily to scale, emphasis instead being placed upon illustrating the principles of the inventive concepts. In the drawings.

DETAILED DESCRIPTION OF EXAMPLE EMBODIMENTS

Figure 1:
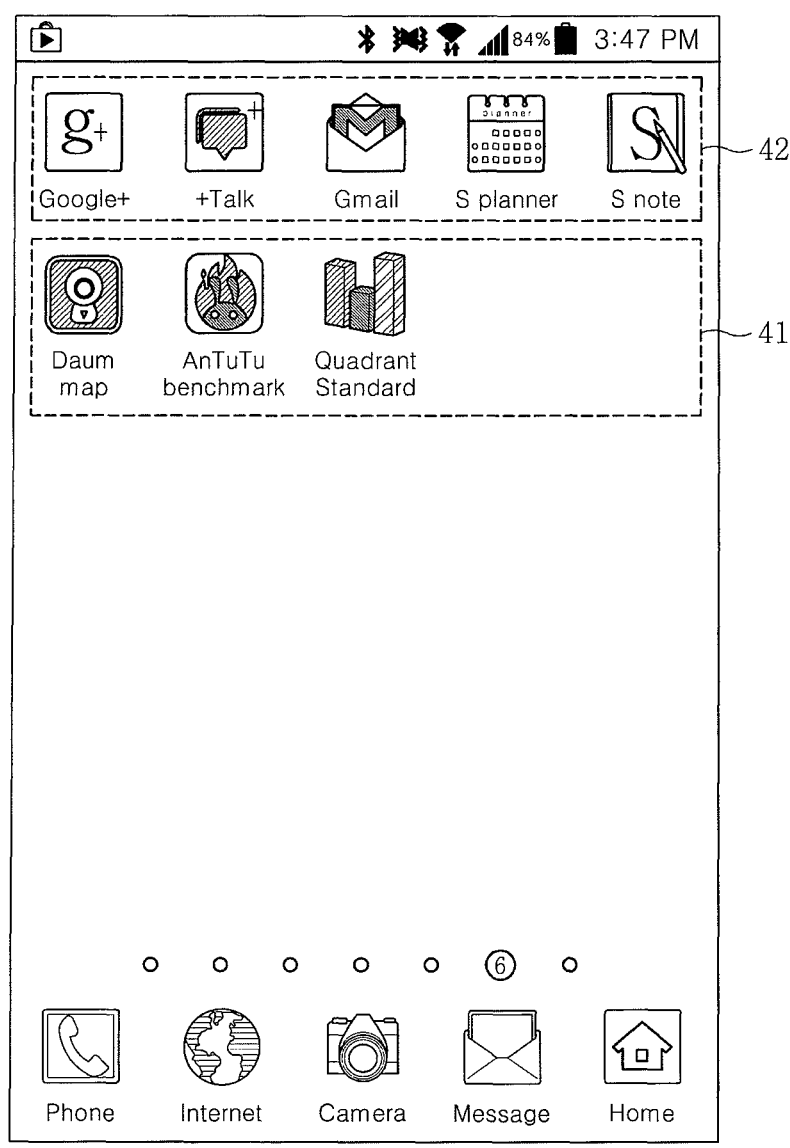
FIG. 1 is a block diagram illustrating a display of a mobile system according to an embodiment of the inventive concept.

Various embodiments will now be described more fully with reference to the accompanying drawings. These inventive concepts may, however, be embodied in different forms and should not be construed as limited to the embodiments set forth herein. Rather, these embodiments are provided so that this disclosure is thorough and complete and fully conveys the inventive concept to those skilled in the art. In the drawings, the relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-sectional illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In order to more specifically describe exemplary embodiments, various aspects will be hereinafter described in detail with reference to the attached drawings.

FIG. 1 is a block diagram illustrating a display of a mobile system 100 according to an embodiment of the inventive concept.

Referring to FIG. 1, a plurality of applications 41, 42 may be installed in the mobile system 100, shown in FIG. 1 as icons corresponding to the applications 41, 42, respectively. The applications include normal applications 41, for example, downloaded from an applications store, referred to as an Appstore, or other repository, and built-in applications 42 installed at the mobile system 100 by the manufacturer, for example, prior to purchase by a user of the mobile system 100.

If an application installed in the mobile system 100 is executed, the mobile system 100 can include one or more processors or the like for providing a workload that may increase so that the application can operate, or execute, at the mobile system 100. If the workload increases, the mobile system 100 may raise an operation clock or a drive voltage. Typically, if the same resource is provided, for example, a processor, then the mobile system 100 may provide the same performance. The performance of the mobile system 100 may be rated by a bench-marking application. Applications for bench-marking the mobile system 100 can include but not limited to Quadrant™ and/or Antutu™ bench-marking applications.

Generally, if a workload increases at the mobile system 100, the mobile system 100 may raise an operation clock, an operation voltage, and/or a bandwidth of a data bus. On the other hand, the mobile system 100 according to an embodiment of the inventive concept may determine actual execution conditions of the application before the application actually begins to run, and subsequently increase the performance of the mobile system 100 according to the determined result. An internal structure of the mobile system will be detailed in conjunction with the illustrations provided at least at FIGS. 3 and 5.

The mobile system 100 may be implemented as a smart phone, a tablet computer, or a digital camera employing an Android operating system. According to some embodiments, the mobile system 100 may be implemented as a Galaxy S3™ 16, a Galaxy note 10.1™ 17, or a Galaxy Camera™ 18.

Figure 2:
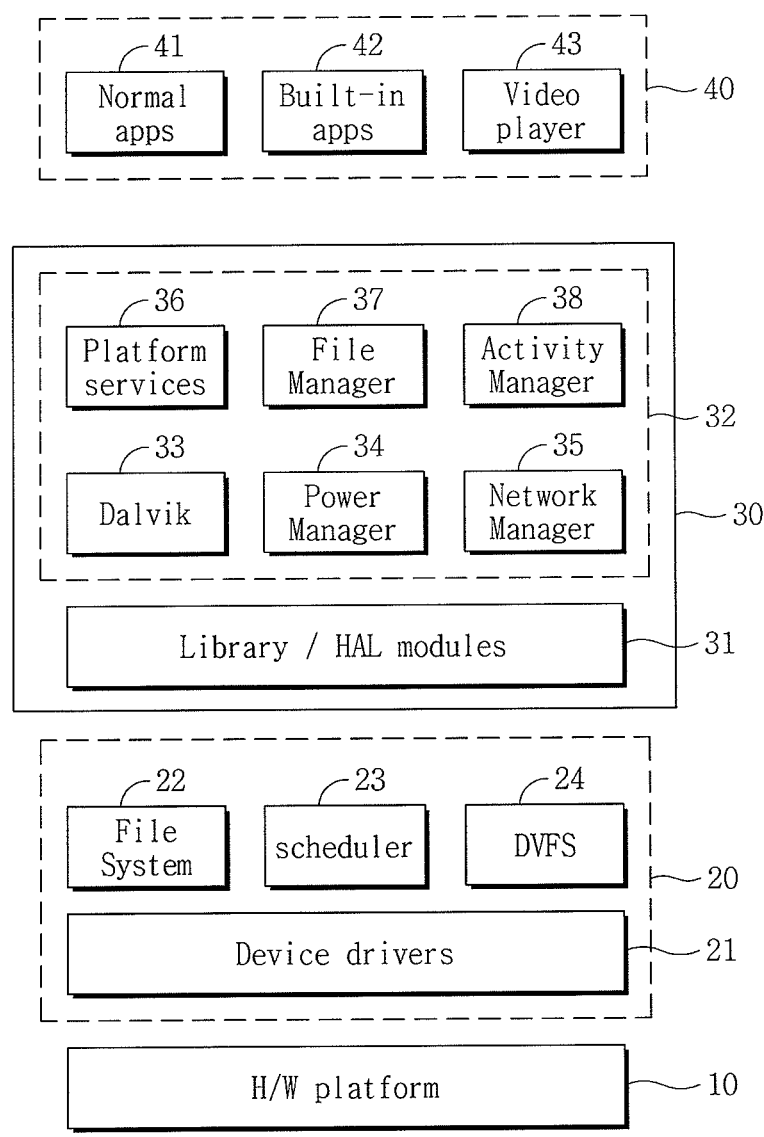
FIG. 2 is a block diagram illustrating a hierarchical structure of the mobile system shown in FIG. 1.

FIG. 2 is a block diagram illustrating a hierarchical structure of the mobile system 100 shown in FIG. 1.

Referring to FIG. 2, the mobile system 100 may include a hardware platform 10, which can include a display device, a touch panel, a camera, an application processor, and so on.

The hardware platform 10 may be controlled by a kernel 20. The kernel 20 may include a file system 21, a scheduler 22, a dynamic voltage and frequency scaling (DVFS) means 23, and a set of device drivers 24 that interface with elements of the hardware platform, such as a display device, etc.

A platform layer 30 of the hierarchical structure may provide a common system service and a hardware abstract layer (HAL) for executing one or more applications at an application layer 40, as well as the hardware 10, by way of the kernel 20. According to some embodiments, the platform layer 30 may include a Blackberry OS™, an OOS™, an Android™, or TIZEN™ platform.

Additionally, the mobile system 100 may include the application layer 40 that controls the hardware 10 on the platform layer 30 for the purpose of extending functionality.

The platform layer 30 may include one or more library/HAL modules 31 and an application framework 32.

The application framework 32 may include a virtual machine (VM) 33, a power manager 34, a network manager 35, platform services 36, a file manager 37 and an activity manager 38.

The library/HAL module 31 may provide a library and a hardware abstraction platform for executing applications at the application layer 40.

Assuming that the platform layer 30 includes an Android™ platform, the VM 33, for example, a Dalvik VM 33, referred to herein as a Dalvik 33, can act as a process virtual machine executing on the Android™ platform. The power manager 34 may manage power requirements of the mobile system 100. The network manager 35 may manage network resources of the mobile system 100. The platform services 36 may manage services implemented on the Android™ platform. The file manager 37 may manage files resident to or otherwise related to the mobile system 100. The activity manager 38 may manage application runtimes.

The application 40 may include one or more normal applications 41, one or more built-in applications 42, a video player application 43, and/or other applications known to those of ordinary skill in the art.

A normal application 41 can be an application which is purchased by a user from an application store or provided free of charge.

A built-in application 42 can be an application provided from a communication service company or a manufacturer of the mobile system 100, and may be installed in the product without a consideration of a user. For example, a built-in application 42 may be Gmail application provided with an Android™ operating system of the mobile system 100.

The video player application 43 may replay motion picture files stored in the mobile system 100.

Figure 3:
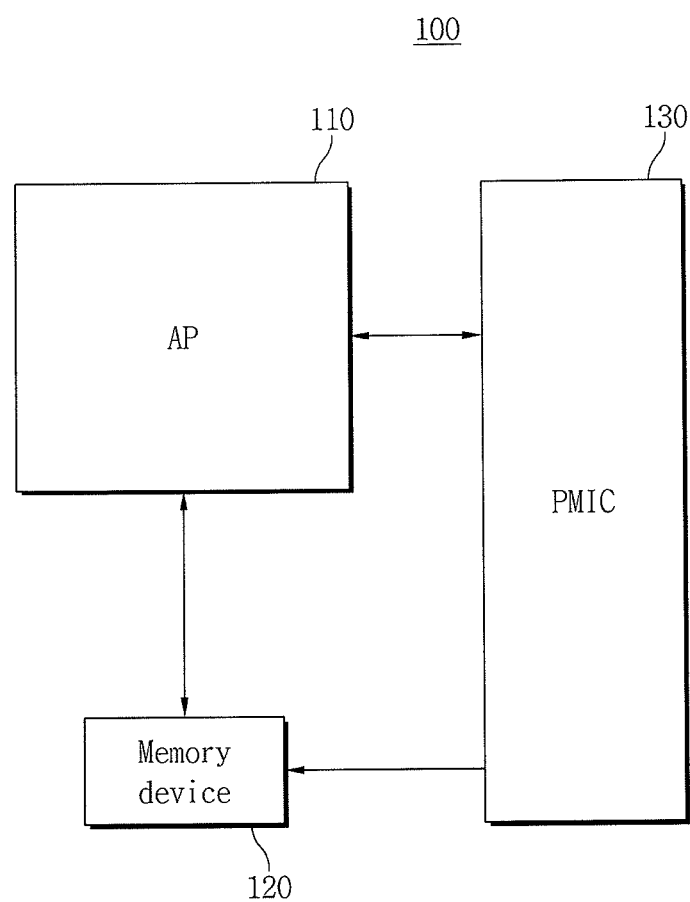
FIG. 3 is a block diagram illustrating the mobile system shown in FIG. 1.

FIG. 3 is a block diagram illustrating the mobile system 100 shown in FIG. 1.

Referring to FIG. 3, the mobile system 100 may include an application processor 110, a memory device 120, an application processor 110, and a power management integrated circuit (PMIC) 130 that supplies and manages power provided to the memory device 120 and/or the application processor 110.

The application processor 110 may access the memory device 120. Additionally, the application processor 110 may include a memory controller for controlling the memory device 120. The application processor 110 will be detailed in conjunction with FIG. 4. In some embodiments, the application processor 110 may be constructed and arranged in a smart phone, a tablet computer, a digital camera, a smart television, or other electronic apparatus.

The memory device 120 may store an operating system (OS) for operating the mobile system 100 or an application that runs on the operating system. Additionally, the memory device 120 may store or output data in response to a request from the application processor 110. In an embodiment, the memory device 120 may be implemented as a dynamic random access memory (DRAM) or a flash memory device that is a nonvolatile memory device.

The PMIC 130 may supply power to some or all of the components of the mobile system 100. In particular, the PMIC 130 may output an adjusted amount of power to the application processor 110 and the memory device 120. For example, if a workload of the application processor 110 increases resulting in the need for additional power, the PMIC 130 may raise a voltage supplied to the application processor 110. Similarly, if the workload of the application processor 110 decreases, the PMIC 130 may reduce a voltage supplied to the application processor 110.

Figure 4:
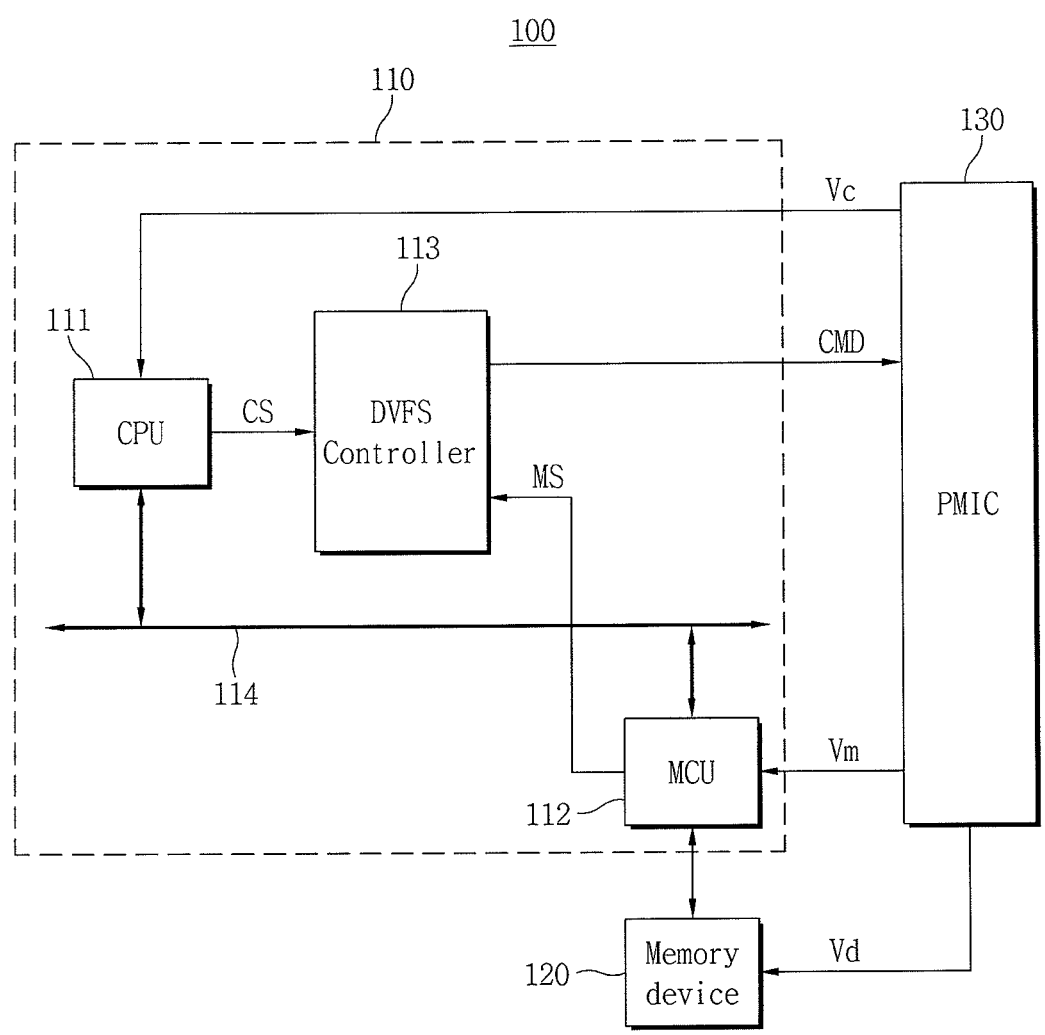
FIG. 4 is a block diagram illustrating an application processor shown in FIG. 3.

FIG. 4 is a block diagram illustrating an application processor 110 shown in FIG. 3.

Referring to FIGS. 1 to 4, the application processor 110 may include a central processing unit (CPU) 111, a memory control unit (MCU) 112, and a DVFS controller 113.

In an embodiment, the CPU 111 may be implemented as an ARM™ processor or the like. The CPU 111 may access the memory device 120 via the MCU 112. In this manner, the MCU 112 may control the memory device 120. If the memory device 120 is formed of a DRAM, the MCU 112 may be implemented as a DRAM controller. Otherwise, if the memory device 120 is formed of a flash memory device, the MCU 112 may be implemented as a flash memory controller.

The DVFS controller 113 may perform control-related actions with a command signal CMD to regulate a voltage which is supplied according to a workload of the CPU 111 and the MCU 112.

For example, if numerous commands are stored in a work queue, the MCU 112 may transfer a workload MS of the MCU 112 to the DVFS controller 113. The DVFS controller 113 may determine a current amount of work based on the workload MS of the MCU 112. If the DVFS controller 113 determines that the workload of the MCU 112 is large, the DVFS controller 113 may output a command CMD to the PMIC 130 for increasing a voltage supplied to the MCU 112.

Similarly, if few commands are stored in the work queue of the MCU 112, the MCU 112 may transfer the workload MS of the MCU 112 to the DVFS controller 113. The DVFS controller 113 may determine a current amount of work based on the workload MS of the MCU 112. If the DVFS controller 113 determines that the workload of the MCU 112 is small, the DVFS controller 113 may output a command CMD to the PMIC 130 for decreasing a voltage supplied to the MCU 112.

Additionally, the application processor 110 may further include a system bus 114 to connect the CPU 111 with the MCU 112.

The CPU 111 may transfer its workload CS to the DVFS controller 113. The DVFS controller 113 may transfer a command CMD depending on the workload CS of the CPU 111 to the PMIC 130. In response to the command CMD, the PMIC 130 may regulate a voltage Vc supplied by the PMIC 130 to the CPU 111.

The MCU 112 may transfer a workload MS of the MCU 112 to the DVFS controller 113. The DVFS controller 113 may transfer a command CMD to the PMIC 130 depending on the workload MS output from the MCU 112. The PMIC 130 may regulate at least one of a voltage Vm supplied to the MCU 112, a voltage Vd supplied to the memory device 120, and a voltage Vc supplied to the CPU 111 according to the command CMD. Additionally, the PMIC 130 may regulate a voltage Vd supplied to the memory device 120 according to the command CMD, in response to the workload MS.

For example, a user may run at least one normal application 41 which is installed in the mobile system 100. By executing the normal application 41, the workload of the CPU 111 may increase. The CPU 111 may transfer state information CS to the DVFS controller 113 in response to the workload.

The DVFS controller 113 may output a command CMD to control the PMIC 130. Furthermore, the DVFS controller 113 may control an operation clock of the CPU 111, for example, increasing the operation clock.

Alternatively, the mobile system 100 according to embodiments of the inventive concept may parse the normal application 41 and control the functionality of the application processor 110 in accordance with the parsed result. That is, the mobile system 100 may enhance the performance of the CPU 111 before the workload of the CPU 111 increases.

In other embodiments, the mobile system 100 executes one or more built-in applications 42, receives execution information from a built-in application 42, and controls its performance with reference to the received execution information before the built-in application 42 handles its actual workload. Summarily, the mobile system 100 may increase the performance of the CPU 111 before the workload of the CPU 111 increases.

Additionally, the mobile system 100 may reduce the performance of the application processor 110 if the parsed result from the normal application 41 indicates that performance does not meet a predetermined condition, or if a combination of conditions results in low performance.

Figure 5:
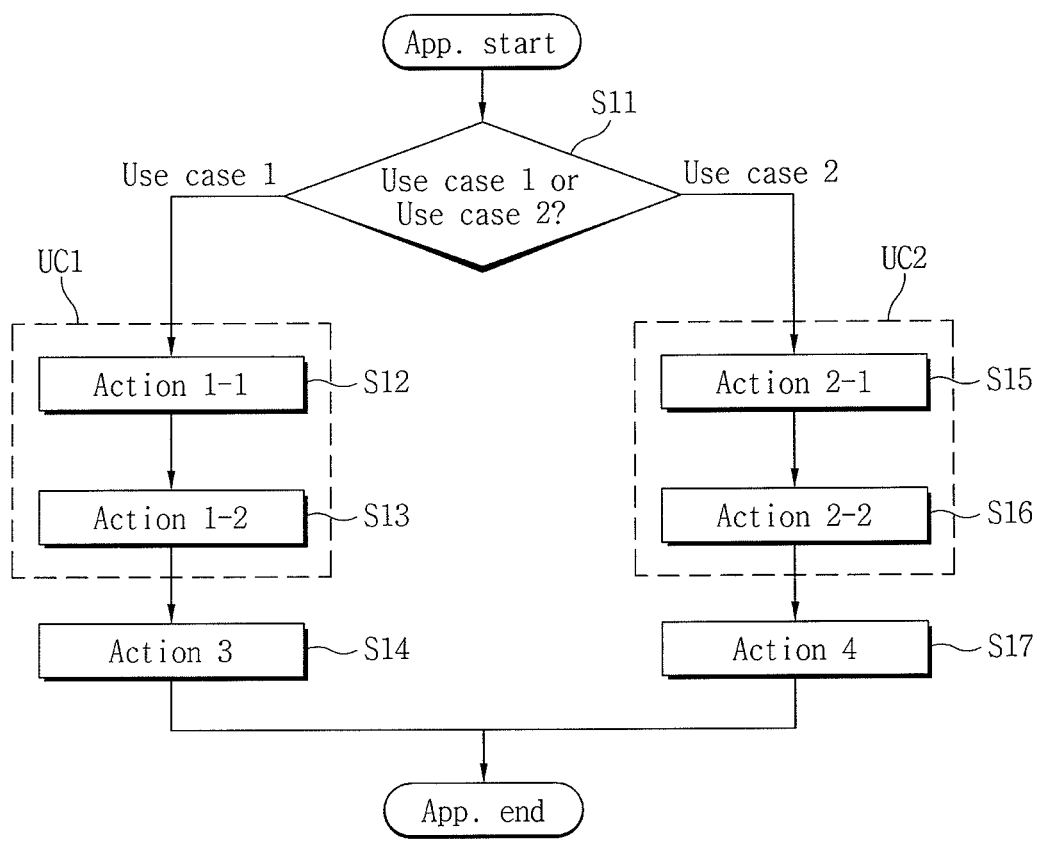
FIG. 5 is a flowchart illustrating a procedure performed at the mobile system 100 shown in FIG. 1.

FIG. 5 is a flowchart illustrating a procedure performed at the mobile system 100 shown in FIG. 1. In FIG. 5, the procedure is performed on, but is not limited to, a normal application 41.

In an embodiment, the procedure relates to a use case, which represents a set of functionality required of the mobile system 100 for an application. The use case may be composed of one or more detailed actions. Therefore, a use case may be composed of an operation scenario of actions.

Applications may include at least one use case. For example, a benchmark application such as the Quadrant™ application may include an I/O test use case, a 3D test use case, etc.

In operation S11, a determination is made whether a first use case UC1 has been executed or a second use case UC2 has been executed. If the first use case UC1 has been executed, then operations S12, S13 and S14 may be executed. If the second use case UC2 has been executed, then operations S15, S16 and S17 may be executed.

In operations S12 and S13, the first use case UC1 may be executed. In detail, as illustrated at operation S12, action 1-1 of the first use case UC1 is executed. In operation S13, action 1-2 of the first use case UC1 is executed. In operation S14, action 3 is executed, after which the application may be terminated.

In operations S15 and S16, the second use case UC2 may be executed. In detail, in operation S15, action 2-1 of the second use case UC2 is executed. In operation S16, action 2-2 of the second use case UC2 is executed. In operation S17, action 4 is executed, after which the application may be terminated.

Figure 6A:
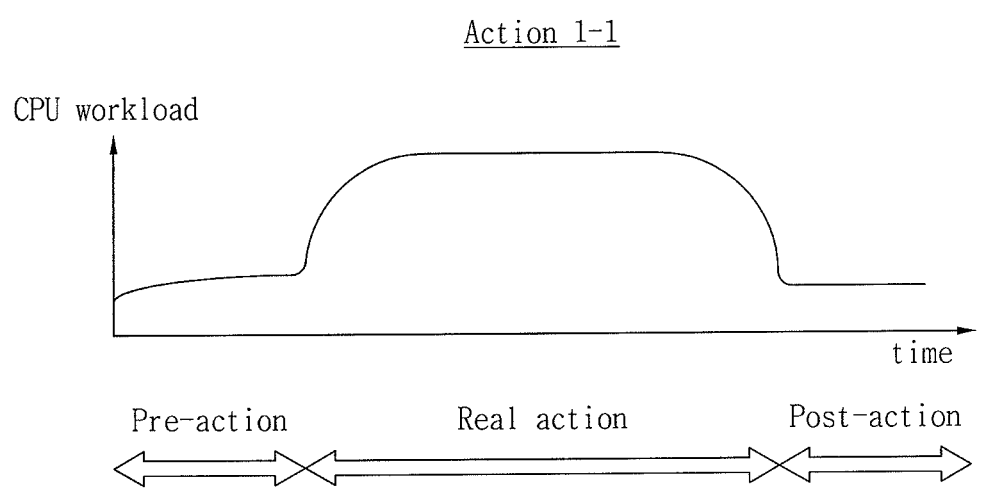
FIGS. 6A and 6B illustrate a load of the central processing unit and operations of the action shown in FIG. 5.
Figure 6B:
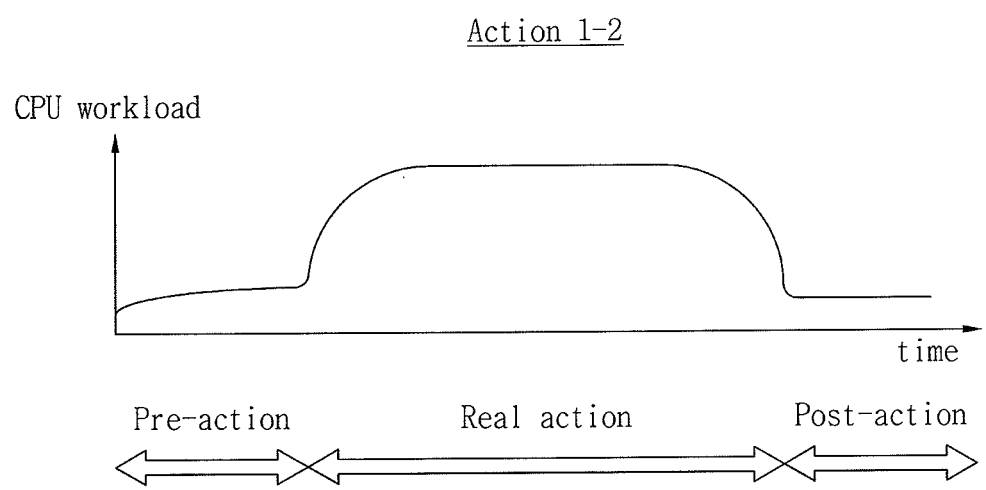

FIGS. 6A and 6B illustrate the workload of a central processing unit and operations of the actions of the first use case UC1 shown in FIG. 5. In describing FIGS. 6A and 6B, reference is made to the CPU 111 herein.

FIG. 6A illustrates operations of the action 1-1 related to the first use case UC1 and the workload of the CPU 111 according thereto. FIG. 6B illustrates operations of the action 1-2 related to the first use case UC1 and the workload of the CPU 111 according thereto.

Referring to FIG. 6A, the action 1-1 of the first use case UC1 may include a pre-action operation, a real action operation, and a post-action operation. The pre-action operation can be an operation that includes preparing for a workload of the CPU 111 needed to run the application. The real action operation can include an execution operation of the CPU 111 needed to run the application. And the post-action operation can include an operation for terminating the application.

With regard to the action 1-1 of the first use case UC1, the workload of the CPU 111 may be increased in the real action operation, i.e., between the pre-action operation and the post-action operation. In general, if the workload of the CPU 111 increases, then the performance of the application processor 110 may increase. On the other hand, in the mobile system 100 according to some embodiments, the performance of the application processor 110 may be increased before the workload of the CPU 111 increases. In detail, in the pre-action operation, i.e., the operation of preparing for an actual workload of the CPU 111, the mobile system 100 may increase the performance of the application processor 110.

Referring to FIG. 6B, like the action 1-1 of the first use case UC1, the action 1-2 of the first use case UC1 may be composed of a pre-action operation, a real action operation, and a post-action operation.

With regard to the action 1-2 of the first use case UC1, the workload of the CPU 111 may be increased in the real action operation. Therefore, in the mobile system 100 according to embodiments of the inventive concept, the performance of the application processor 110 may be increased in the pre-action operation before the workload of the CPU 111 increases.

Figure 7:
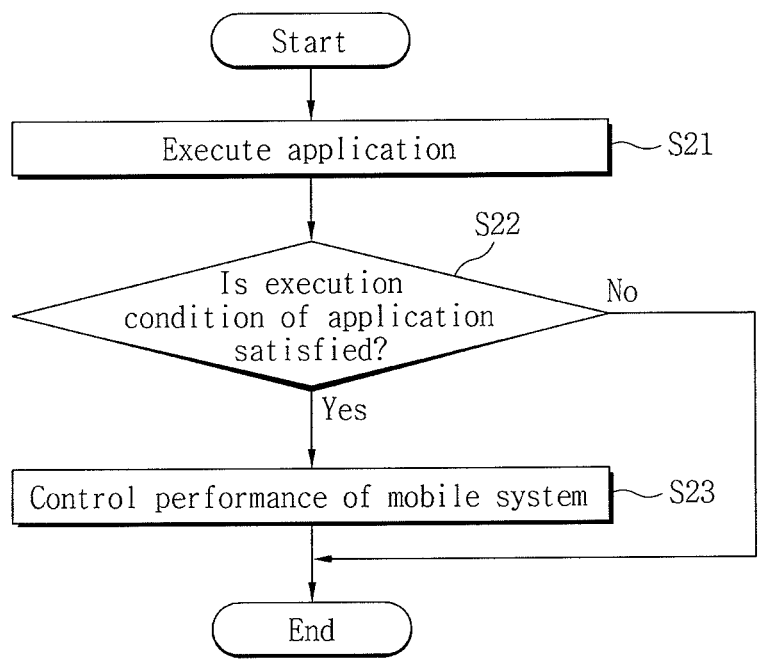
FIG. 7 is a flowchart illustrating a mobile system optimization method according to an embodiment of the inventive concept.

FIG. 7 is a flowchart illustrating a mobile system optimization method, in accordance with an embodiment.

Referring to FIG. 7, in operation S21, a user may run at least one of the applications installed in the mobile system 100. For instance, the user may run a normal application 41.

Operations for executing the normal application 41 may include an operation related to a preparation of the workload of the normal application 41, an operation related to the handling of an actual workload of the normal application 41, and an operation related to the termination of the workload of the normal application 41.

In operation S22, the mobile system 100 may determine an execution condition of the normal application 41 and whether an execution of the application 41 is satisfied. The operation of determining the execution condition of the normal application 41 may include an operation of parsing the normal application 41 and/or an operation of controlling the performance of the mobile system 100 in accordance with the parsed result. In detail, the operation of parsing the normal application 41 may include an operation of determining which operation may be executed by the normal application 41.

The operation of controlling the performance of the mobile system 100 may include an operation of regulating at least one of the operation clock of the application processor 110, the drive voltage to be supplied to the application processor 110, and a bandwidth of the data bus.

If a determination is made at operation S22 that the execution condition of the application is satisfied, then the method proceeds to operation S23, where, before the application executes the actual workload, the mobile system 100 may control the performance of the application processor 110 in accordance with the determined result. If the normal application 41 terminates, an operation of reducing the performance of the application processor 110 may be further included thereafter.

Figure 8:
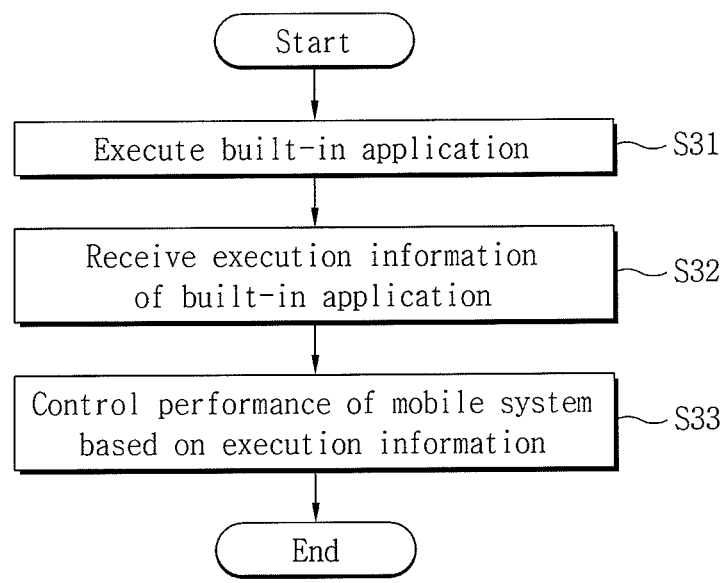
FIG. 8 is a flowchart illustrating a mobile system optimization method according to an embodiment of the inventive concept.

FIG. 8 is a flowchart illustrating a mobile system optimization method, in accordance with an embodiment.

Referring to FIG. 8, in operation S31, a user may run one of the applications which are installed in the mobile system. For instance, the user may run a built-in application 42.

Operations of executing the built-in application 42 may include an operation related to a preparation for a workload of the built-in application, an operation related to an execution of an actual workload of the built-in application 42, and an operation related to a termination of the workload of the built-in application 42.

In operation S32, the application processor 110 may receive execution information about the built-in application 42. The operation of receiving the execution information about the built-in application 42 may include an operation that includes receiving information that which operation is performed by the built-in application. An operation of controlling the performance of the mobile system 100 may include an operation that includes regulating at least one of the operation clock of the application processor 110, the drive voltage of the application processor 110, and the bandwidth of the data bus.

In operation S33, before the built-in application 42 begins to execute its actual workload, the performance of the mobile system may be controlled on the basis of the received execution information.

Figure 9:
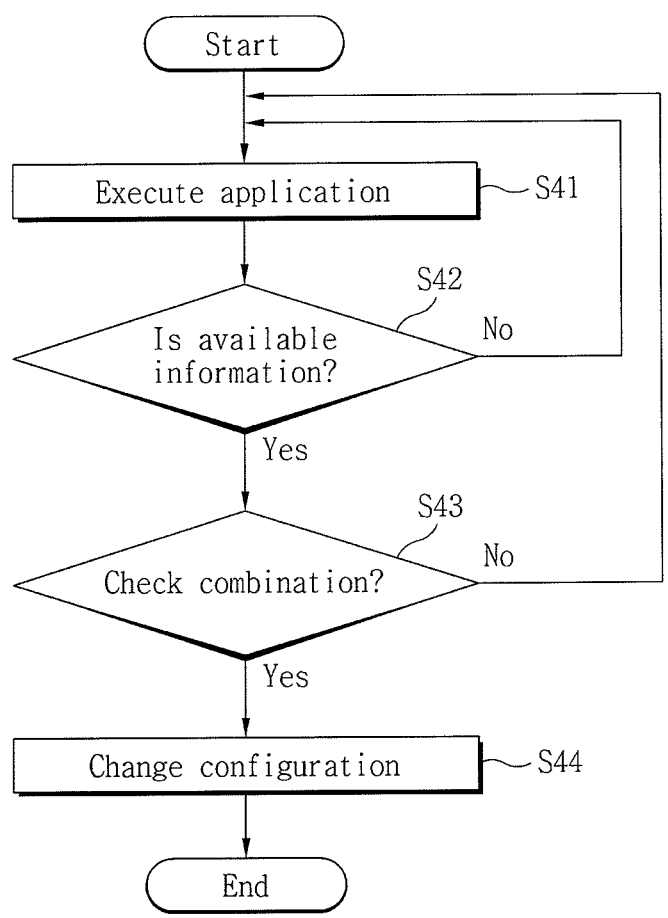
FIG. 9 is a flowchart illustrating a mobile system optimization method according to an embodiment of the inventive concept.

FIG. 9 is a flowchart illustrating an optimization method of a mobile system 100 according to an embodiment of the inventive concept.

In operation S41, the mobile system 100 can execute an application. In doing so the mobile system 100 may wait for information. For example, the mobile system 100 may receive information about an execution condition of the normal application 41 or execution information about the built-in application 42.

In operation S42, the mobile system 100 determines whether the information is valid. If the information is valid, the method proceeds to operation S43. Otherwise, the method proceeds to operation S41.

In operation S43, the mobile system 100 checks one or more combinations of execution conditions. For example, if the mobile system 100 receives the information about the execution condition of the normal application 41, then the mobile system 100 determines whether the combinations of execution conditions are satisfied.

Additionally, if the mobile system 100 receives the execution information about the built-in application 42, then the mobile system 100 determines whether combinations of execution information are satisfied. If the combinations are all satisfied, then operation S44 is carried out. If not, then operation S41 is carried out.

In operation S44, the mobile system 100 may change a configuration, for example, a setup condition, to control its performance.

Figure 10A:
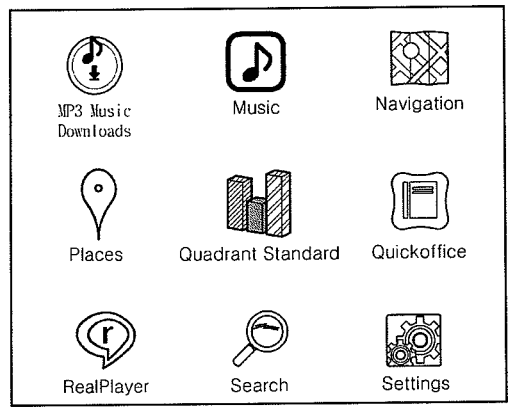
FIG. 10A is a screenshot of a set of applications installed in the mobile system shown in FIG. 1.
Figure 10B:
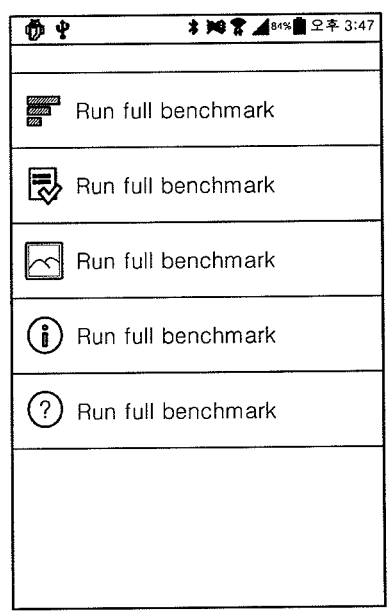
FIG. 10B illustrates a screen corresponding to the execution of a Quadrant™ application among the applications shown in FIG. 10A.

FIG. 1 0A is a screenshot of a set of applications installed in the mobile system 100 shown in FIG. 1, and FIG. 10B illustrates a screen corresponding to the execution of a Quadrant™ application among the applications shown in FIG. 10A.

Referring to FIGS. 2, 10A and 10B, a user may execute the Quadrant™ application from an electronic device having a display or other peripheral components permitting the receipt of user-generated commands, for example, a smartphone, a laptop computer, and so on. The Quadrant™ application is a typical benchmarking application measuring the performance of the mobile system 100.

If a use case of the Quadrant™ application is executed, the activity manager 38 may parse information of an application launched therein and then recognize that the Quadrant™ application is a benchmarking application.

In order to increase the performance of the mobile system 100, the power manager 34 may activate a configuration set of predefined BENCH_START through the kernel 20.

The following shows a command controlling the performance of the mobile system 100 by detecting the execution of the Quadrant™ application, and a result according thereto.

Write (BENCH_START, kernel_sysfs_opt)
CPU1, CPU2, CPU3, CPU4 max freq 1.8 GHz
Kernel_sysfs_opt is a location at which the configuration set of BENCH_START may be stored. For example, the CPU 111 may include four processor cores CPU1~CPU4. Each operation clock of the four processor cores CPU1~CPU4 may be set to a maximum frequency of 1.8 GHz.

In other words, in the mobile system 100, if the activity manager 38 detects that a use case of the Quadrant™ application is executed, then the power manager 34 may change the configuration set for regulating the performance of the mobile system 100.

If a test use case of the Quadrant™ application is executed, then the activity manager 38 may monitor a spawn child thread of the benchmark processor and recognize generation from pool-thread 1 to pool-thread 4, for example, test runner threads of the CPU 111.

To increase the performance of the mobile system 100, the power manager 34 may set a configuration set of predefined BENCH_CPU through the kernel 20.

The following shows a command that can control the performance of the mobile system 100 by detecting execution of the Quadrant™ application, and a result according thereto.

Write (BENCH_CPU, kernel_sysfs_opt)
CPU1, CPU2 freq 1.6 GHz CPU3, CPU4 OFF
Kernel_sysfs_opt refers to a location at which the configuration set of BENCH_CPU may be stored. For example, the CPU 111 may include four processor cores CPU1~CPU4. Each operation clock of the processor cores CPU1 and CPU2 may be set to 1.6 GHz, and CPU3 and CPU4 may be set to an off state.

If a test use case of the Quadrant™ application is executed, then the file manager 37 may keep an event related to file access used for an IO test waiting. Additionally, the file manager 37 may recognize that the current time precedes the beginning of the IO test, through an open event of the tmp file in a directory, for example, /data/data/com.aurorasoftworks.quadrant/files/.

To increase the performance of the mobile system 100, the power manager 34 may set a configuration set of predefined BENCH_IO through the kernel 20.

The following shows a command controlling the performance of the mobile system 100 by detecting an execution of the Quadrant™ application, and a result according thereto.

Write (BENCH_IO, kernel_sysfs_opt)
CPU1, CPU2 freq 1.6 GHz CPU3, CPU4 OFF
MIF800/INT400
Kernel_sysfs_opt refers to a location at which the configuration set of BENCH_IO may be stored. For example, the CPU 111 may include four processor cores CPU1~CPU4. Each operation clock of the processor cores CPU1 and CPU2 may be set to 1.6 GHz, and CPU3 and CPU4 may be set to an off state. An operation clock of the memory device may be set to 800 KHz, and a bandwidth of the bus may be set to 400 MHz.

If a 3-dimensional (3D) test use case of the Quadrant™ application is executed, then the activity manager 38 may recognize the generation of a 3D test runner thread. And the activity manager 38 may parse the address of /proc/<testtID>/stat and recognize a beginning of the 3D test at a change of resume state.

To increase the performance of the mobile system 100, the power manager 34 may set a configuration set of predefined BENCH_3D through the kernel 20.

The following shows a command controlling the performance of the mobile system 100 by detecting an execution of the Quadrant™ application, and a result according thereto.

Write (BENCH_3D, kernel_sysfs_opt)
CPU1, CPU2 freq 1.6 GHz CPU3, CPU4 OFF
MIF800/INT400
GPU clock 480 MHz, GPU Voltage 1.1V
Kernel_sysfs_opt refers to a location at which the configuration set of BENCH_3D may be stored. For example, the CPU 111 may include four processor cores CPU1~CPU4. Each operation clock of the processor cores CPU1 and CPU2 may be set to 1.6 GHz, and CPU3 and CPU4 may be set to an off state. An operation clock of the memory device may be set to 800 MHz, and a bandwidth of the bus may be set to 400 MHz. And, an operation clock of a graphics processing unit (GPU) may be set to 480 MHz, and an operating voltage of the GPU may be set to 1.1 V.

Figure 11:
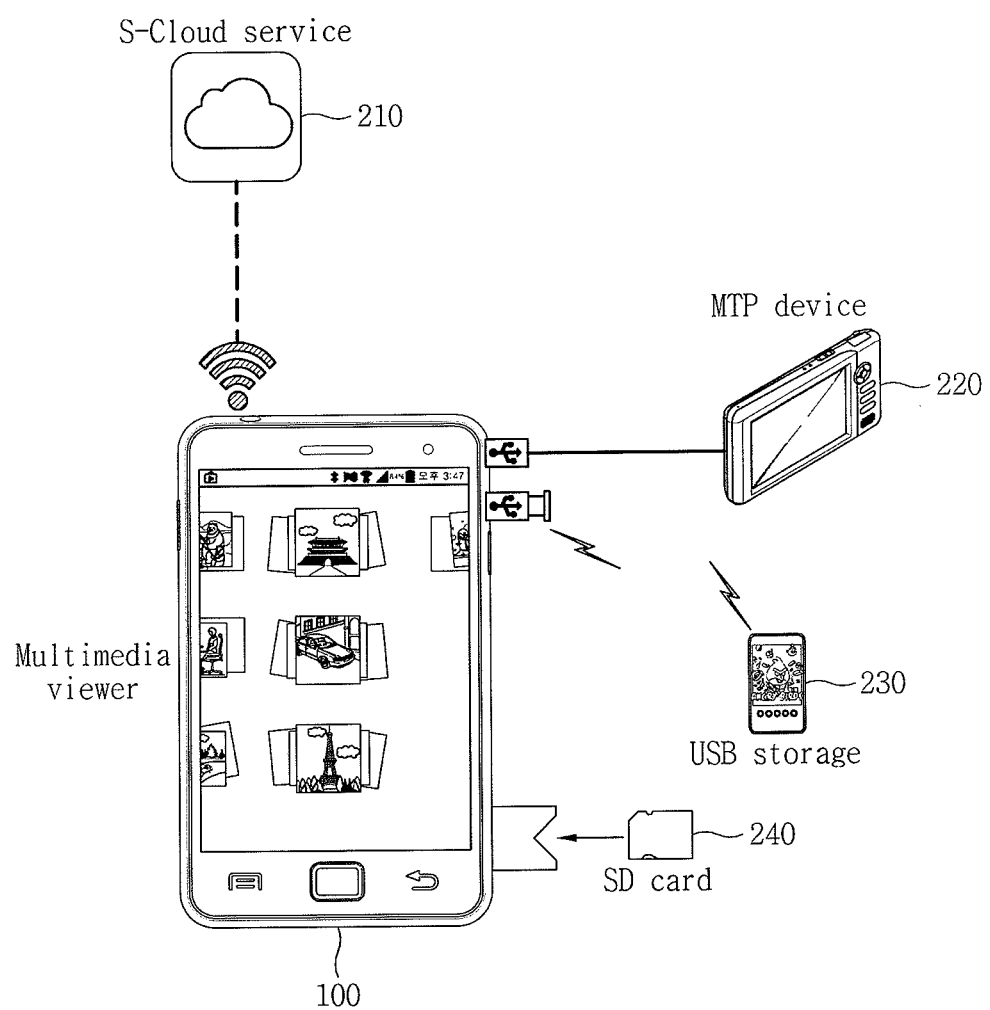
FIG. 11 illustrates a driving operation of the mobile system shown in FIG. 1.

FIG. 11 illustrates a driving operation of the mobile system 100 shown in FIG. 1.

Referring to FIGS. 2 and 11, the mobile system 100 can use a Samsung cloud service (S-cloud) 210 or the like by way of an interface such as a Wi-Fi interface. That is, the mobile system 100 may execute an S-cloud application as a built-in application, for example, described herein.

The mobile system 100 may recognize network authority and the S-cloud application from execution information about the built-in application 42. And, if a URL requested by the built-in application is an address of the S-cloud application, and is accompanied by a request for file download, then the mobile system 100 may increase its performance.

To increase the performance of the mobile system 100, the network manager 35 may increase the number of http connections, for example, from two http connections to four http connections. The file manager 37 may extend a read ahead of a server file, for example, from 128 bytes to 1024 Kbytes.

As another example, if a Gallery application or the like is executed, then the mobile system 100 may access an external device. For instance, the mobile system 100 can be connected with a digital camera 220 or related Media Transfer Protocol (MTP) device by way of a USB cable. Otherwise, the mobile system 100 can be connected with USB storage 230 by way of a wireless USB interface. Additionally, the mobile system 100 can be connected to a device internally equipped with a secure digital (SD) card 240.

The mobile system 100 may recognize a group ID needed to read/write data on an SD card, from execution information of the Gallery application, and identify the gallery application. The mobile system 100 may recognize that the Gallery application is running on the highest level of the window. Additionally, the mobile system 100 may recognize that the Gallery application requests a mount service. If a combination of these three conditions is satisfied, then the mobile system 100 may increase its own performance. In detail, the Dalvik VM 33 (see FIG. 2) may increase the priority of the mount service. Additionally, the Dalvik VM 33 may raise a clock frequency of CPU0 to the highest level after migrating media scanner work to CPU0. Then the file manager 37 may extend the read ahead, which is related to a requested external device, for example, from 128 bytes to 1024 Kbytes.

Figure 12:
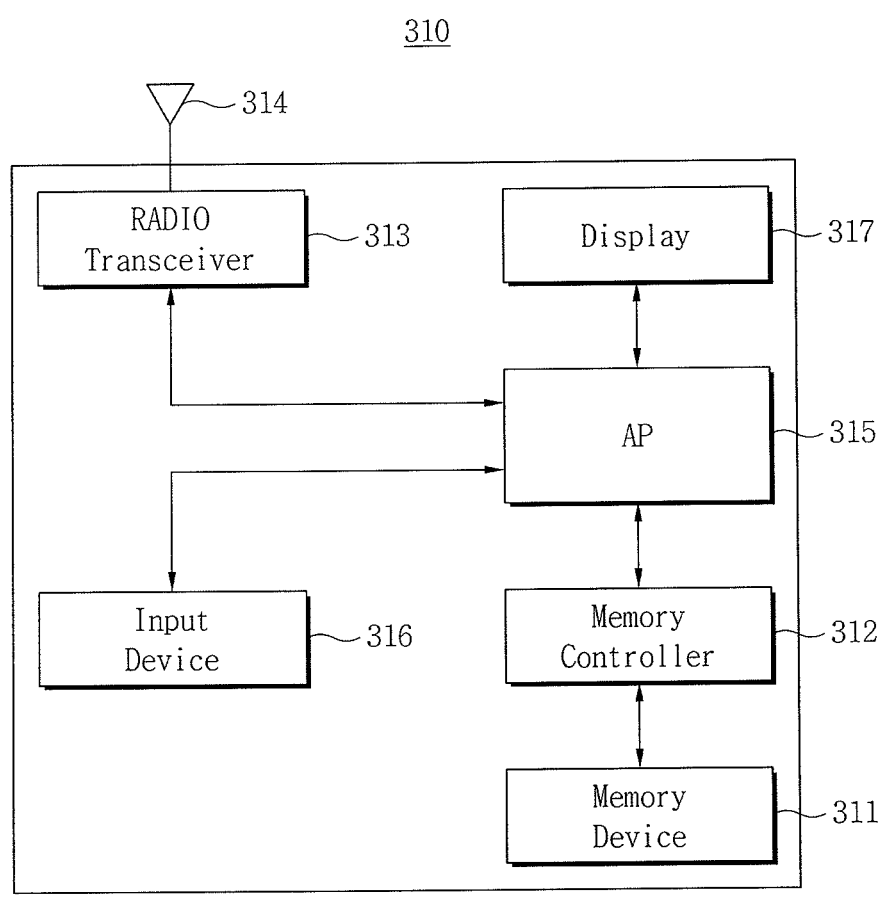
FIG. 12 illustrates an embodiment of a computer system including the application processor shown in FIG. 3.

FIG. 12 illustrates an embodiment of a computer system 310 including the application processor 110 shown in FIG. 3.

Referring to FIG. 12, the computer system 310 includes a memory device 311, a memory controller 312 that controls the memory device 311, a wireless transceiver 313, an antenna 314, an application processor (AP) 315, an input device 316, and a display 317.

The wireless transceiver 313 can transmit and receive a wireless signal by way of the antenna 314. For example, the wireless transceiver 313 can transform a wireless signal received through the antenna 314 into a signal that can be processed at the application processor 315.

Accordingly, the application processor 315 can process a signal output from the wireless transceiver 313, and transfer the processed signal to the display 317. Additionally, the wireless transceiver 313 can transform a signal output from the application processor 315 into a wireless signal, and output the wireless signal to an external device via the antenna 314.

The input device 316 can be a device capable of inputting a control signal for controlling an operation of the application processor 315, or data to be processed by the application processor 315, may be implemented as a pointing device such as a touch pad or a computer mouse, a keypad, or a keyboard.

According to embodiments, the memory controller 312 capable of controlling the memory device 311 may be implemented as a part of the application processor 315, or as a chip that is independent of the application processor 315.

According to embodiments, the application processor 315 may include the application processor 110 shown in FIG. 2.

Figure 13:
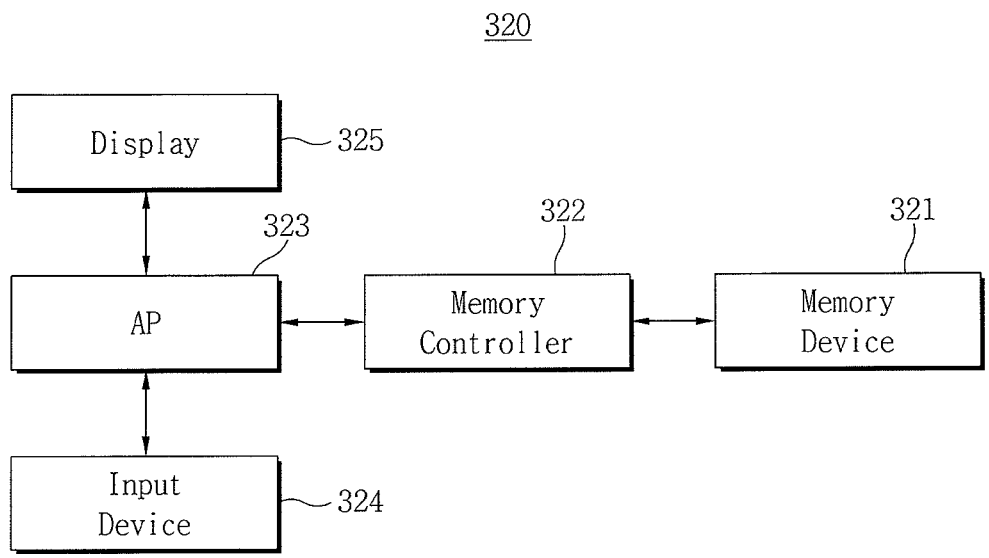
FIG. 13 illustrates another embodiment of a computer system including the application processor shown in FIG. 3.

FIG. 13 illustrates another embodiment of a computer system 320 including the application processor 110 shown in FIG. 3.

Referring to FIG. 13, the computer system 320 may be implemented as an electronic device such as a personal computer (PC), a network server, a tablet PC, a net book, an e-reader, a personal digital assistant (PDA), a portable multimedia player (PMP), an MP3 player, an MP4 player, and/or other multi-media player.

The computer system 320 can include a memory device 321, a memory controller 322 capable of controlling a data processing operation of the memory device 321, an application processor (AP) 323, an input device 324, and a display 325.

The application processor 323 can display data stored in the memory device 321 in accordance with data input through the input device 324 on the display 325. For example, the input device 324 may be implemented as a pointing device such as a touch pad or a computer mouse, a keypad, or a keyboard. The application processor 323 can control overall operation of the computer system 320 and control an operation of the memory controller 322.

According to some embodiments, the memory controller 322 is capable of controlling the memory device 321 and may be implemented as a part of the application processor 323, or as a chip that is independent of the application processor 323.

According to embodiments, the application processor 323 may include or otherwise be similar to or the same as the application processor 110 shown in FIG. 2.

Figure 14:
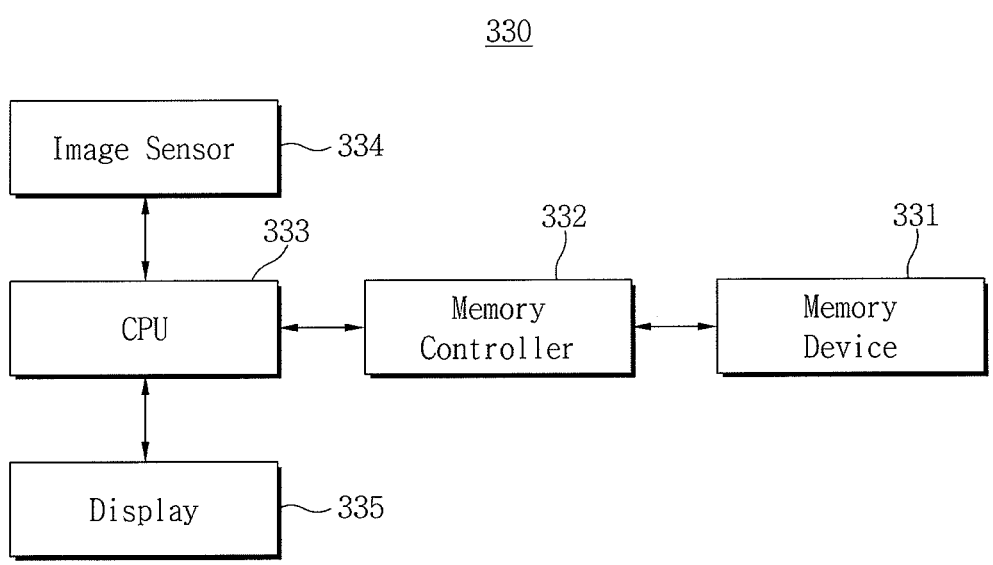
FIG. 14 illustrates still another embodiment of a computer system including the application processor shown in FIG. 3.

FIG. 14 illustrates another embodiment of a computer system 330 including the application processor 110 shown in FIG. 3.

Referring to FIG. 14, the computer system 330 may be implemented in an image processing device, e.g., a digital camera, or a mobile phone, a smart phone or a tablet PC equipped with a digital camera.

The computer system 330 can include a memory controller 332 capable of controlling a data processing operation of the memory device 331, e.g., a writing operation or a reading operation. Additionally, the computer system 330 can include a CPU 333, an image sensor 334, and a display 335. The CPU 333 can include an application processor (AP), for example, described herein.

The image sensor 334 of the computer system 330 converts an optical image into digital signals, and the converted digital signals are transferred to the CPU 333 or the memory controller 332. Under control of the CPU 333, the converted digital signals can be displayed through the display 335 or stored in the memory device 331.

Additionally, data stored in the memory device are displayed through the display 335 under control of the CPU 333 and/or the memory controller 332.

According to embodiments, the memory controller 332 is capable of controlling the memory device 331 and may be implemented as a part of the application processor 333, or as a chip that is independent of the application processor 333.

According to embodiments, the CPU 333 may include the application processor 110 shown in FIG. 2.

Consequently, the mobile system optimization method according to the inventive concept can enhance the performance of a mobile system or the like while utilizing the same resources.

The foregoing is illustrative of embodiments and is not to be construed as limiting thereof. Although a few embodiments have been described, those skilled in the art will readily appreciate that many modifications are possible in embodiments without materially departing from the novel teachings and advantages. Accordingly, all such modifications are intended to be included within the scope of this inventive concept as defined in the claims. In the claims, means-plus-function clauses are intended to cover the structures described herein as performing the recited function, and not only structural equivalents but also equivalent structures. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A method for managing a performance of a mobile system, the method comprising:
   executing an application at the mobile system;
   before executing the application, determining an execution condition of the application by parsing the application if the application is a normal application and by receiving the execution condition if the application is a built-in application to identify the application; and
   controlling a performance of the mobile system in response to a result of the determined execution condition before the application performs an actual workload, wherein the mobile system includes a processor that processes the application to perform the actual workload, and wherein a performance of the processor is increased before a workload of the processor increases, wherein executing the application comprises:
  preparing for a workload of the application;
  executing the actual workload by the application; and
  terminating the workload by the application, and
wherein controlling the performance of the mobile system comprises:
  increasing the performance of the mobile system contemporaneously with the application preparing for the workload.

2. The method according to claim 1, wherein determining the execution condition of the application comprises:
  parsing the application; and
  controlling the performance of the mobile system in accordance with the parsed result.

3. The method according to claim 2, wherein parsing the application comprises:
  identifying whether one among an ID, an event, and a use case of the application is used.

4. The method according to claim 2, wherein controlling the performance of the mobile system comprises:
  regulating at least one of an operation clock of the mobile system, a drive voltage supplied to hardware forming the mobile system, and a bandwidth of a data bus.

5. The method according to claim 1, further comprising:
  reducing the performance of the mobile system in response to a termination of the execution of the application.

6. A method for managing a performance of a mobile system equipped with a built-in application, the method comprising:
  before executing the built-in application, receiving execution information about the built-in application to identify the application;
  controlling a performance of the mobile system with reference to the received execution information before the built-in application executes an actual workload, wherein the mobile system includes a processor that processes the built-in application to perform the actual workload, and wherein a performance of the processor is increased before a workload of the processor increases, and
  executing the built-in application,
  wherein executing the built-in application comprises:
  preparing for a workload of the built-in application;
  executing the actual workload by the built-in application; and
  terminating the workload of the built-in application, and
  wherein controlling the performance of the mobile system comprises:
  increasing the performance of the mobile system while the built-in application prepares for the workload.

7. The method according to claim 6, wherein receiving the execution information about the built-in application comprises:
  receiving information about which operation is executed by the built-in application.

8. The method according to claim 6, wherein controlling the performance of the mobile system comprises:
  regulating at least one of an operation clock of the mobile system, a drive voltage supplied to hardware forming the mobile system, and a bandwidth of a data bus.

9. The method according to claim 6, further comprising:
  reducing the performance of the mobile system in response to a termination of the execution of the built-in application.

10. The method according to claim 6, wherein executing the actual workload of the built-in application comprises:
  increasing a workload of the mobile system.

11. The method according to claim 10, wherein increasing the workload of the mobile system comprises:
  increasing the performance of the mobile system in accordance with the workload of the mobile system.

12. A method for managing performance of a mobile system, the method comprising:
  before executing an application, determining an execution condition of an application by parsing the application if the application is a normal application and by receiving the execution condition if the application is a built-in application to identify the application;
  executing the application by a processor at the mobile system;
  determining whether an execution condition of the application is satisfied; and
  controlling a performance of the mobile system in response to a determination that the execution condition of the application is satisfied, wherein a performance of the processor is increased before a workload of the processor increases,
  wherein the performance is controlled before an actual workload of the application is executed, and
  wherein controlling the performance of the mobile system comprises:
  increasing the performance of the mobile system contemporaneously with the application preparing for a workload.

13. The method according to claim 12, wherein determining the execution condition of the application comprises:
  parsing the application; and
  controlling the performance of the mobile system in accordance with the parsed result.

14. The method according to claim 12, further comprising:
  reducing the performance of the mobile system in response to a termination of the execution of the application.

* * * * *